United States Patent

Makita

[11] Patent Number: 5,897,719
[45] Date of Patent: Apr. 27, 1999

[54] CLAD MEMBER AND METHOD OF MANUFACTURING SAME

[75] Inventor: Harumitsu Makita, Hamamatsu, Japan

[73] Assignee: Kabushiki Kaisha Kawai Gakki Seisakusho, Hamamatsu, Japan

[21] Appl. No.: 08/904,021

[22] Filed: Jul. 31, 1997

Related U.S. Application Data

[62] Division of application No. 08/708,584, Sep. 5, 1996, Pat. No. 5,840,418.

[30] Foreign Application Priority Data

Sep. 7, 1995 [JP] Japan .................................. 7-230451

[51] Int. Cl.$^6$ ....................................................... B05D 3/06
[52] U.S. Cl. ........................... 148/525; 427/555; 427/556
[58] Field of Search ............................. 148/525; 427/555, 427/556

[56] References Cited

U.S. PATENT DOCUMENTS

| | | | |
|---|---|---|---|
| 4,157,923 | 6/1979 | Yen et al. | 148/525 |
| 5,554,415 | 9/1996 | Turchan et al. | 148/525 |

FOREIGN PATENT DOCUMENTS

| | | |
|---|---|---|
| 8-24980 | 1/1996 | Japan . |
| 8-33991 | 2/1996 | Japan . |

*Primary Examiner*—George Wyszomierski
*Attorney, Agent, or Firm*—Nikaido, Marmelstein, Murray & Oram LLP

[57] ABSTRACT

A clad member is made up of a plate-like clad base material having on its surface a recessed portion, and solidified portions of a metallic material which is different in kind from the clad base material. The solidified portions are disposed in the recessed portion at a distance from each other and are bonded with the clad base material through melting. The clad member is manufactured by forming an elongated recessed portion on a surface of a plate-like clad base material. The recessed portion is filled with a comminuted metallic material which is different in kind from the clad base material. A laser beam is irradiated onto a plurality of regions which are separated from each other in a longitudinal direction of the recessed portion such that partly melted portions of the comminuted metallic material are generated to thereby bond the comminuted metallic material with the clad base material. The melted portions are solidified. The remaining non-molten portions of the comminuted metallic material are removed.

1 Claim, 3 Drawing Sheets

5,897,719

CLAD MEMBER AND METHOD OF MANUFACTURING SAME

This is a Division, of application Ser. No. 08/708,584 filed Sep. 5, 1996, now U.S. Pat. No. 5,840,418.

BACKGROUND OF THE INVENTION

1. Field of the Invention

The present invention relates to a clad member in which a different kind of material is partly embedded in a clad base material. It also relates to a method of manufacturing the clad member.

In this specification, the term "clad member" means a "metal-clad semimanufacture" which is made by cladding or overlaying a specified metal on a surface of a "clad base material" which means a base material (i.e., a metal or a ceramic) on which the specified metal is clad or overlaid.

2. Description of the Related Art

As this kind of clad member, there is conventionally known one which is manufactured by the following steps Namely, as shown in FIG. 1, a groove b is formed, by means of rolling or the like, in a clad base material "a" of an elongated copper plate. A strip-like material c, such as nickel, which is different in kind from that of the clad base material is fitted into the groove b, and the assembly thus obtained is rolled together to thereby obtain a clad member in which the different kind of material is embedded in the longitudinal direction of the clad base material. This kind of clad member is then sliced into pieces to use each of these sliced pieces as a component part for electrical contact of a bimetal, or the like.

The above-described clad member can be manufactured relatively cheaply However, the strip-like material to be embedded into the clad base material extends in the longitudinal direction of the clad base material "a." Therefore, if an electrical component part such as shown in FIG. 2 is manufactured by means, e.g., of pressing the assembly, there is a disadvantage in that the embedded strip-like material c will be partly wasted as a trash. In case the strip-like material c is made of a rare metal or a noble metal, the loss by this waste becomes enormous. Even if the trash is recovered for reuse, the increase in the product cost is inevitable

SUMMARY OF THE INVENTION

The present invention has an object of providing a clad member that is inexpensive and is free from such a waste, as well as a method of manufacturing the clad member.

According to one aspect of the present invention, the above object is attained by a clad member comprising: a plate-like clad base material having on its surface a recessed portion; and solidified portions of a metallic material which is different in kind from the clad base material, the solidified portions being disposed in the recessed portion at a distance from each other and being bonded with the clad base material through melting.

In another example, the clad member comprises: a plate-like clad base material having on its surface a plurality of recessed portions; and solidified portions of a metallic material which is different in kind from the clad base material, each of the solidified portions being disposed in each of the plurality of recessed portions and being bonded with the clad base material through melting.

According to another aspect of the present invention, there is provided a method of manufacturing a clad member comprising the steps of: forming an elongated recessed portion on a surface of a plate-like clad base material; filling said recessed portion with a comminuted metallic material which is different in kind from the clad base material; irradiating a laser beam onto a plurality of regions which are separated from each other in a longitudinal direction of the recessed portion such that partly melted portions of the comminuted metallic material are generated to thereby bond the comminuted metallic material with the clad base material; solidifying the melted portions; and removing remaining non-molten portions of the comminuted metallic material.

In another example, the method comprises the steps of: forming a plurality of recessed portions on a surface of a plate-like clad base material at a distance from each other; filling each of the recessed portions with a comminuted metallic material which is different in kind from the clad base material; irradiating a laser beam onto the comminuted metallic material such that the comminuted material is melted for bonding with the clad base material; and thereafter solidifying the comminuted metallic material.

Preferably, the step of forming a plurality of recessed portions on the surface of the plate-like clad base material is performed by laser irradiation.

In the above-described "another" example, the step of forming a plurality of recessed portions on the surface of the plate-like clad base material may comprise the steps of: forming a plurality of perforated holes in the plate-like clad base material at a distance from each other; placing the clad base material on a flat supporting plane; filling each of the perforated holes, up to a predetermined depth, with a comminuted material which is similar to the clad base material; irradiating a laser beam onto the comminuted material such that the comminuted material is melted for bonding with the clad base material; and thereafter solidifying the comminuted material.

The above-described clad base material is a metallic material or a ceramic.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 3:
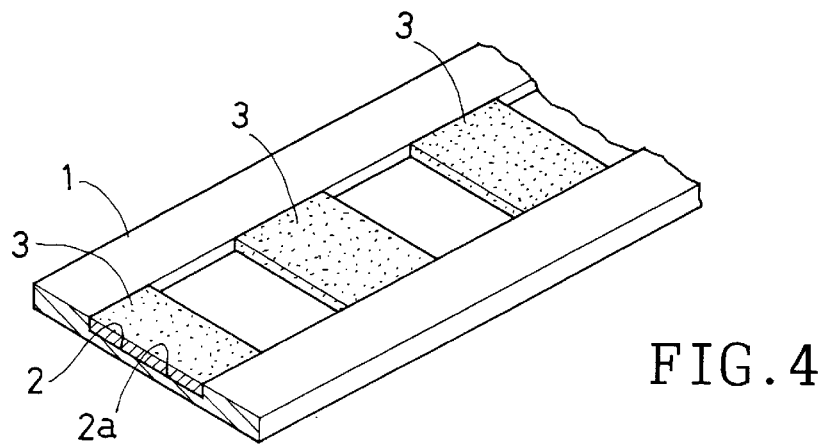
FIG. 3 is a perspective view of an important portion of a first example of a clad member according to the present invention.
Figure 4:
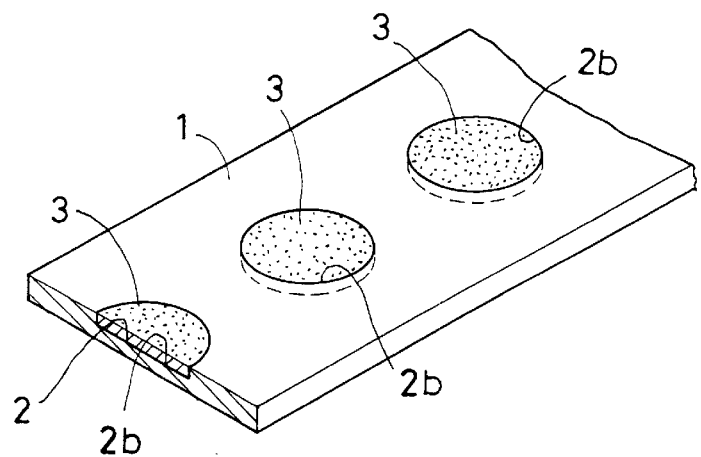
FIG. 4 is a perspective view of an important portion of a second example of a clad member according to the present invention.

In FIGS. 3 and 4, reference numeral 1 denotes a clad base material which is made up of a metal such as a plate-like copper, cupronickel, nickel, or the like or else of a ceramic. On the surface of this clad base material there is formed a dented portion 2 with a forming means in the form of rolling, cutting, or the like. As the clad base material, there is used an elongated metallic material or a strip-shaped ceramic material. Depending on the use to which a clad member is put, the dented portion 2 is formed into an elongated groove 2a or into independent dented portions 2b which are scattered in a plurality of portions at a distance therebetween as shown in FIG. 4. Inside the dented portion 2, there is provided a solidified portion (i.e., a portion made by hardening of a molten material) 3 of a metallic material which is different in kind from the material of the clad base material 1. The solidified portion is bonded, through melting or fusion, with the clad base material 1 by melting with a laser beam of a carbon dioxide laser or the like. In case the dented portion 2 is an elongated groove 2a as shown in FIG. 3, the solidified portion 3 is provided in a plurality of pieces inside the elongated groove 2a at a distance therebetween. In case the dented portion 2 is made up of independent dented portions 2b as shown in FIG. 4, the solidified portion 3 is provided in each of the dented portions 2b.

Figure 1:
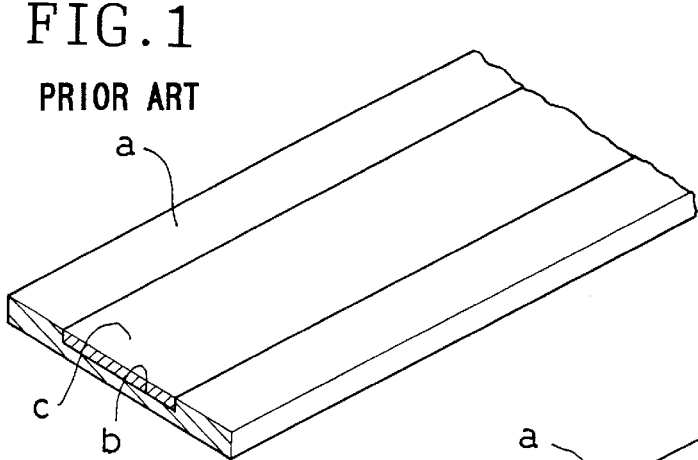
FIG. 1 is a perspective view of a conventional clad member.
Figure 2:
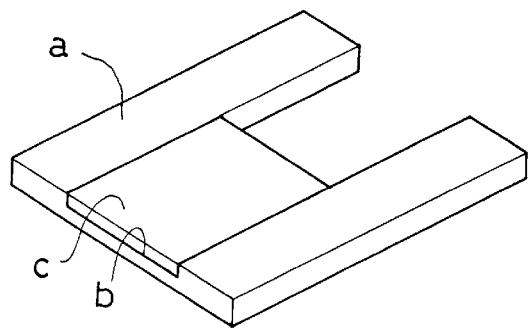
FIG. 2 is a perspective view of one example of a component part which is manufactured by using the clad member in FIG. 1.

It is advantageous to use a rare metal and a noble metal as the metallic material for the purpose of forming the solidified portion 3. If an electric component part in the shape as shown in FIG. 2 is made by pressing the clad member of the present invention using the above-described metallic material, the solidified portion 3 can be prevented from becoming a refuse after the pressing work, with the result that the metallic material in the solidified portion 3 will not be wasted.

Figure 5:
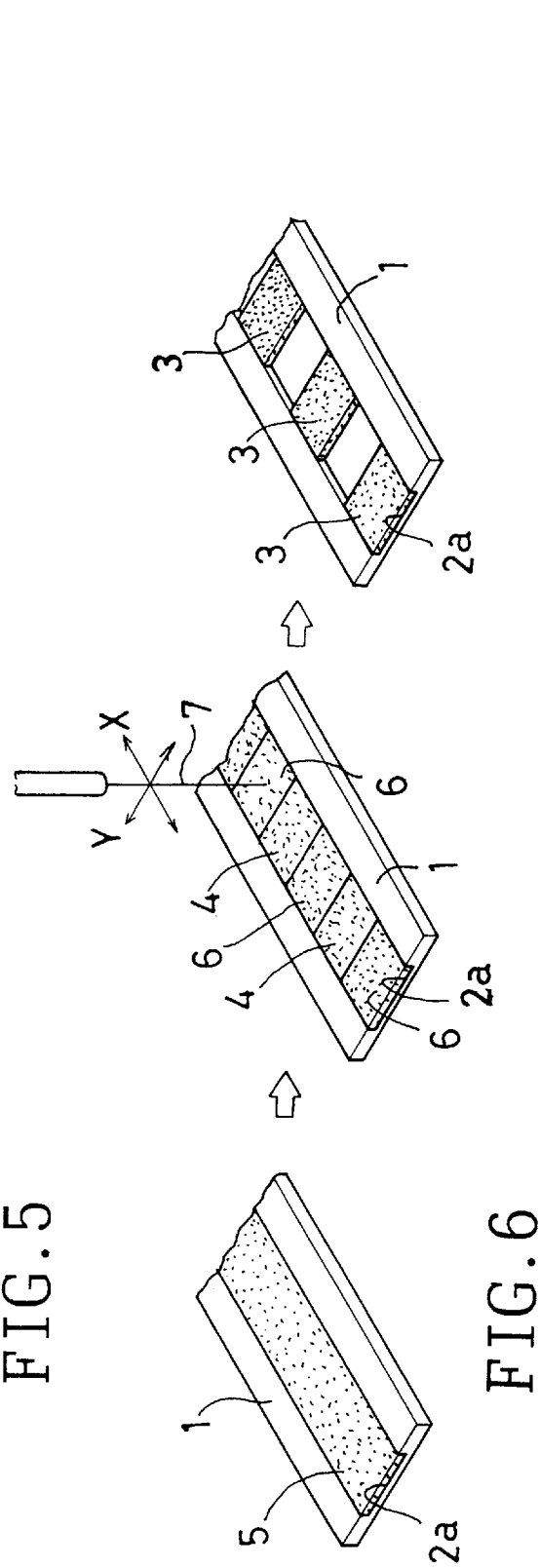
FIG. 5 is a schematic diagram to explain a first method of manufacturing the clad member.

FIG. 5 shows a schematic process diagram of a method of manufacturing the clad member having an elongated groove 2a as shown in FIG. 3. Inside the elongated groove 2a there is filled, with a suitable feeding means, a comminuted or finely particulate metallic material 5 such as metallic powders or metallic foils made up of a material different in kind from that of the clad base material 1. A laser beam 7 is irradiated, while moving in the X–Y directions, onto regions 6 which are disposed in the longitudinal direction of the elongated groove 2a while leaving a distance 4 therebetween. By this operation, the comminuted metallic material in each of the above-described regions 6 separated from each other by the above-described distance 4 is melted. The surface of the clad base material 1 is also subjected to heating at the same time and is also melted depending on the conditions. After the comminuted metallic material has been solidified or hardened, there are formed a plurality of solidified portions 3 which have been bonded, through melting, with the clad base material 1. Since the comminuted metallic material 5 within the range of the above-described distance 4 is in a non-molten state, it can easily be removed from inside the elongated groove 2a. As a result of the above-described removal, there can be obtained a clad member in which the solidified portions 3 are present inside the elongated groove 2a at intervals from each other. The solidified portions 3 attain a securely bonded condition as a result of the melting combination with the clad base material 1. A higher reliability of combination can be secured than in the case of adhesion through pressing.

Figure 6:
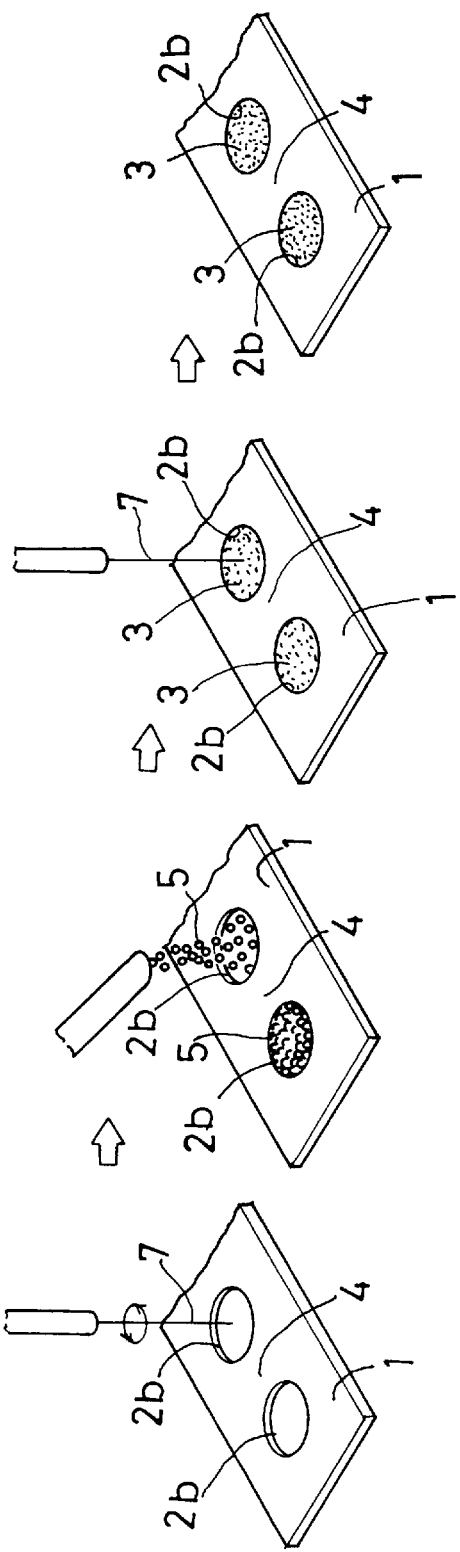
FIG. 6 is a schematic diagram to explain a second method of manufacturing the clad member.

FIG. 6 shows a schematic process diagram of a method of manufacturing a clad member with a plurality of independent dented portions 2b which are disposed in the clad base material 1 at a distance from each other. In this method, by using a laser beam 7, independent dented portions 2b are formed in the clad base material 1 at a distance 4 from each other. Inside each of the independent dented portions 2b, there is filled, with a suitable feeding means, a comminuted metallic material 5 such as a metallic powder or the like which is made of a material different in kind from that of the clad base material 1 like in the above-described method. The laser beam 7 is irradiated onto each of the independent dented portions 2b to thereby melt the comminuted metallic material 5. At the same time, the surface of the clad base material 1 is also partly heated and is melted depending on the conditions. Once the comminuted metallic material 5 is solidified, there is formed a solidified portion 3 in which the comminuted metallic material 5 is firmly bonded, through melting, with the clad base material 1. Where necessary, the laser beam 7 is moved inside the respective independent dented portions 2b to thereby melt the comminuted metallic material 5 in the entire respective independent dented portions 2b. By using the laser beam 7 in forming the independent dented portions 2b, the independent dented portions 2b can be easily formed in the ceramic base material 1 which is difficult of machining.

Figure 7:
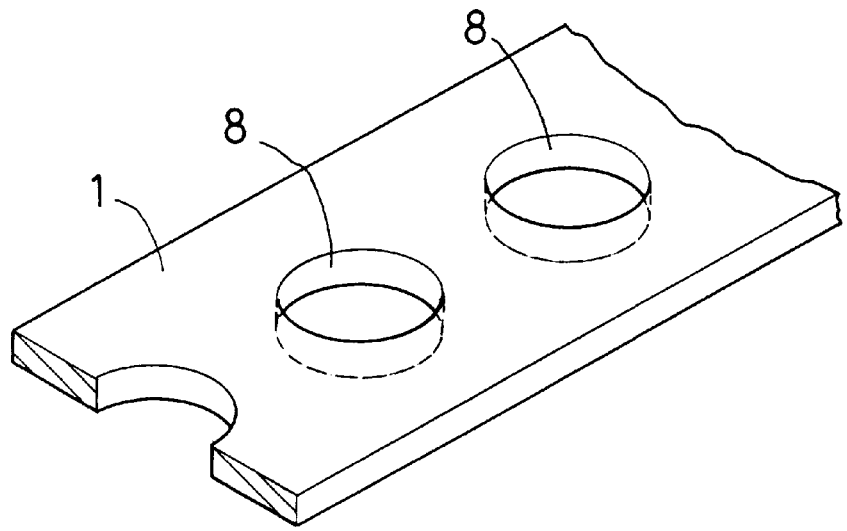
FIG. 7 is a perspective view of a clad base material of a third example of a clad member to be manufactured by a third method of manufacturing the clad member.
Figure 8:
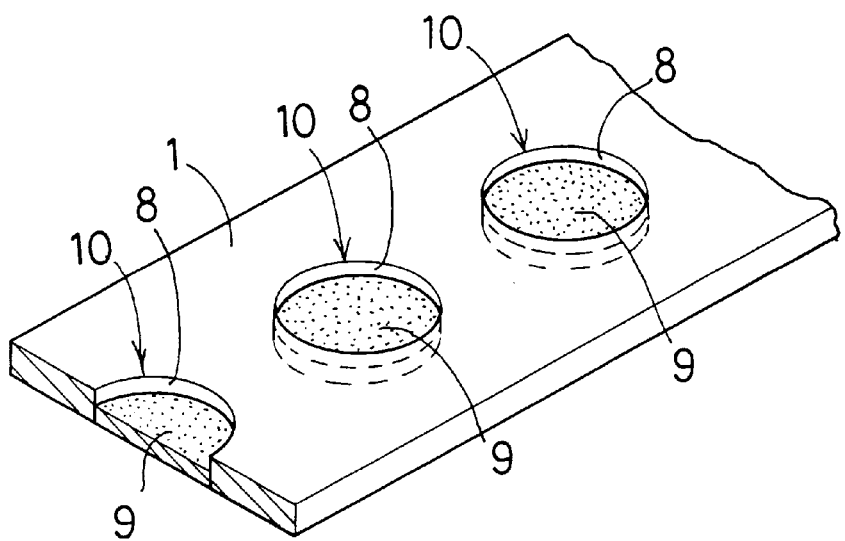
FIG. 8 is a perspective view showing an intermediate state of manufacturing the clad member in which the plurality of recessed portions have been made using the clad base material shown in FIG. 7.

The following method may also be employed in forming dented portions 10 as shown in FIG. 8 which are conventionally difficult of forming. Namely, as shown in FIG. 7, perforated holes 8 are formed in the clad base material 1 by means of a laser beam, pressing, or the like. This base material 1 is then placed on a flat supporting plane, and the perforated holes 8 are filled, to a smaller depth (i.e., not up to the level flush with the upper surface), with the metallic powder 9 or the like of a similar composition as the base material. The metallic powder or the like is then melted by means of the laser beam or the like and is thereafter solidified.

An explanation will now be made about specific examples of the clad member according to the present invention.

EXAMPLE 1

On the surface of a clad base material 1 of elongated copper which has a width of 40 mm, a thickness of 3 mm, and a length of 1 m, there was formed, as a dented portion 2, a strip of elongated groove 2a which has a depth of 1.5 mm and a width of 20 mm over the entire length of the clad base material 1. The clad base material 1 was fed to a carbon dioxide laser machining device while filling one end of the elongated groove 2a with a comminuted metallic material 5 of gold of a particle size of 0.05 mm. The laser beam of 2 kw was irradiated onto regions 6 while leaving a distance 4 of 10 mm therebetween inside the elongated groove 2a. The laser beam 7 with a diameter of 0.2 mm was moved in the X–Y directions to thereby irradiate the entire regions 6 each having a width of 20 mm and a length of 20 mm. By intermittently moving the clad base material 1 in the longitudinal direction thereof, the melted portions 8 of the comminuted metallic material 5 were formed over the entire length of the elongated groove 2a while leaving a distance 4 therebetween. The non-melted comminuted metallic material 5 that remained in the regions corresponding to the distance 4 were recovered by sequentially sucking after the solidification of the melted portions 8. The solidified portions 3 in which the melted portions 6 solidified were bonded, through melting, with the clad base material 1 and had a sufficient bonding strength.

EXAMPLE 2

A clad base material 1 of cordierite ceramic having a width of 90 mm, a thickness of 3 mm, and a length of 250 m was fed to the above-described carbon dioxide laser machining device. By means of the laser beam 7, there were formed in the longitudinal direction on the surface of the clad base material 1 spot-shaped independent dented portions 2b each having a diameter of 5 mm and a depth of 1 mm at a distance of 10 mm therebetween. After this machining step was completed, the clad base material 1 was fed again to the laser machining device while filling the independent dented portions 2b on the clad base material 1 with a comminuted metallic material 5 of gold with a particle size of 0.05 mm. While moving the laser beam 7 within each of the independent recessed portions 2b, the comminuted metallic material 5 inside each of the independent recessed portions 2b was melted. The solidified portions 3 in which the melted portions 6 solidified were bonded, through melting, with the clad base material 1 with a sufficient bonding strength.

As explained hereinabove, according to the present invention, the clad member is manufactured by bonding, through melting, the solidified portion of the metallic material, which is different in kind from the clad base material, with the clad base material inside continuous or independent dented portions which are formed on the surface of the clad base material at a distance from each other. The clad portion of the metallic material which is different in kind from the clad base material is utilized in manufacturing a desired product. Even if the portion other than the clad portion is discarded as a waste, this discarding does not bring about a waste of the metallic material. Therefore, in case a rare metal or a noble metal is used as the metallic material, the cost of the raw materials becomes low. According to the method of manufacturing the clad member of the present invention, the clad member can be manufactured in a relatively inexpensive manner without wasting the comminuted material.

It is readily apparent that the above-described clad member and the method of manufacturing the same meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing a clad member comprising the steps of:

forming a plurality of perforated holes in a clad base material at a distance from each other;

placing said clad base material on a flat supporting plane;

filling each of said perforated holes, up to a depth which is a portion of a total depth of each said respective perforated hole with a first comminuted material which is of a material which is the same as said clad base material;

irradiating a laser beam onto said first comminuted metallic material such that said first comminuted material is melted for bonding with said clad base material;

thereafter solidifying said first comminuted metallic material to form a plurality of recessed portions;

filling each of said recessed portions with a second comminuted metallic material which is a different material from said clad base material;

irradiating a laser beam onto said second comminuted metallic material such that said second comminuted material is melted for bonding with said clad base material; and thereafter solidifying said second comminuted metallic material.

* * * * *